Patented July 18, 1933

1,918,466

UNITED STATES PATENT OFFICE

THEODOR GOOST, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

VULCANIZATION OF ARTIFICIAL RUBBER LIKE MASSES

No Drawing. Application filed May 5, 1930, Serial No. 450,065, and in Germany May 8, 1929.

The present invention relates to a process of vulcanizing artificial rubber like masses derived from butadiene hydrocarbons in the presence of vulcanization accelerators.

In accordance with the invention artificial rubber like masses obtainable by polymerizing butadiene hydrocarbons according to any desired method, for example in the presence of an alkali metal, such as sodium or the like, are vulcanized after having mechanically incorporated therewith a vulcanization accelerator in a liquefied form, sulfur or another vulcanizing agent, such as selenium or the like and, if desired other ingredients known to favorably influence vulcanization processes, more particularly carbon black, other most finely divided fillers, plasticizing agents, pigments or the like. By the term "accelerator in a liquefied form" we understand vulcanization accelerators either dissolved in a suitable organic or inorganic solvent or liquefied by a liquefying agent, it means an agent, by the addition of which the melting point of the accelerator is so much lowered that the whole mixture becomes liquid at least at the temperatures usually applied in calendering the rubber like masses.

For vulcanization purposes the liquefied accelerators are rolled into the artificial rubber like masses together with or separately from the other vulcanization ingredients as mentioned above and vulcanization is performed in the usual manner.

By applying the accelerators in a liquefied form, the physical properties, more particularly the strength and breaking stretch of the vulcanizates, can be very favorably influenced. There is found to exist a fundamental difference from natural rubber in which latter no effect even approximately similar is observed when using the accelerators in a liquefied form. The effect often occurs even when the quantity of solvent amounts to less than 1% of the mixture to be vulcanized, supposing that this amount of solvent is sufficient to dissolve the accelerator applied. The action is particularly great in the case of solid accelerators but has also been observed with liquid accelerators, in consequence of which by the term "accelerators in a liquefied form" also liquid accelerators with the addition of solvents are to be understood. Suitable solvents are, for example, water, alcohols, hydrocarbons, chlorinated hydrocarbons, esters, weak acids, liquid bases or mixtures of bases and the like; as liquefying agents stearic acid, phthalic acid alkyl esters and the like may be mentioned for example.

The invention is illustrated by the following example without being restricted thereto.

100 parts by weight of "butadiene rubber" obtainable by polymerizing butadiene in the presence of sodium metal were vulcanized with the addition of 60 parts by weight of carbon black, 15 parts by weight of zinc oxide, 2 p. b. w. of stearic acid, 2.5 p. b. w. of sulfur and 1 part by weight of aldehyde ammonia as the accelerator. The accelerator was added to one portion of the mixture without solvent and to the other while dissolved in 3 parts of water. The increase of strength and breaking stretch obtained is shown under (1) in the table below.

In a further comparative experiment mercapto benzothiazole was used instead of aldehyde ammonia in one case without solvent and in the other dissolved in 1 part by weight of picoline (see table under (2)).

The comparison shown in the table under (3) was carried out with the same mixture using 1.5% of sulfur with symmetrical ethyl cyclohexyl thiuram disulfide, once without solvent and once dissolved in 3 parts by weight of toluene.

In the comparison shown under (4) with the same vulcanization mixture the ethylhexahydroaniline salt of the dithiocarbamic acid from ethylhexahydroaniline used as accelerator was added once without solvent and once liquefied with 2 parts by weight of stearic acid.

| Accelerator | Solvent | I(+) | II(++) |
| --- | --- | --- | --- |
| (1) Aldehyde ammonia | Water 1:3 | 10% | 70% |
| (2) Mercaptobenzothiazole | Picoline 1:1 | 18% | 160% |
| (3) Symmetrical ethylcyclohexylthiuram disulfide. | Toluene 1:3 | 40% | 45% |
| (4) Ethylhexahydroaniline salt of the dithiocarbamic acid from ethylhexahydroaniline. | Stearic acid 1:2. | 20% | 200% |

(+)=Percent increase of strength (kg/sqcm).
(++)=Increase of tearing stretch (%).

Similar good results are obtained by using as accelerator for example the decahydroquinaldine salt of the dithiocarbamic acid derived from decahydroquinaldine and as liquefying agent the diethylester of phthalic acid in an amount of about 33% by weight of the accelerator. This mixture forms a stiff paste at normal temperature but liquefies at somewhat elevated temperature so that on rolling it into the rubber like masses on a calender at temperatures usually applied for this process, it liquefies and operates as well as preparations which are liquid at normal or lower temperatures. Instead of the butadiene-sodium rubber used in the example other butadiene polymerizates may be applied or polymerizates of other butadiene hydrocarbons, such as isoprene, 2.3-dimethylbutadiene and the like, alone or in admixture with one another, whereby the degree of the favorable influence on the physical properties of the vulcanizates varies to a far reaching extent, mainly depending on the kind of polymerizate employed.

I claim:—

1. Process which comprises mechanically incorporating within an artificial rubber like mass derived from a butadiene hydrocarbon a vulcanizing agent and a vulcanization accelerator in a liquefied form and vulcanizing the mixture in the usual manner.

2. Process which comprises mechanically incorporating within an artificial rubber like mass derived from butadiene a vulcanizing agent and a vulcanization accelerator in a liquefied form and vulcanizing the mixture in the usual manner.

3. Process which comprises mechanically incorporating within an artificial rubber like mass obtained by polymerizing butadiene in the presence of sodium metal, a vulcanizing agent and a vulcanization accelerator in a liquefied form and vulcanizing the mixture in the usual manner.

4. Process which comprises mechanically incorporating within an artificial rubber like mass derived from a butadiene hydrocarbon a vulcanizing agent, a vulcanization accelerator in a liquefied form and other ingredients known to favorably influence vulcanization processes and vulcanizing the mixture in the usual manner.

5. Process which comprises mechanically incorporating within an artificial rubber like mass derived from butadiene a vulcanizing agent, a vulcanization accelerator in a liquefied form and other ingredients known to favorably influence vulcanization processes and vulcanizing the mixture in the usual manner.

6. Process which comprises mechanically incorporating within an artificial rubber like mass obtained by polymerizing butadiene in the presence of sodium metal, a vulcanizing agent, a vulcanization accelerator in a liquefied form and other ingredients known to favorably influence vulcanization processes and vulcanizing the mixture in the usual manner.

7. Process which comprises mechanically incorporating within an artificial rubber like mass obtained by polymerizing butadiene in the presence of sodium metal, sulfur and a solution of vulcanization accelerator and vulcanizing the mixture in the usual manner.

8. Process which comprises mechanically incorporating within an artificial rubber like mass obtained by polymerizing butadiene in the presence of sodium metal, sulfur, other ingredients known to favorably influence vulcanization processes and a solution of vulcanization accelerator and vulcanizing the mixture in the usual manner.

9. Process which comprises mechanically incorporating within 100 parts by weight of an artificial rubber like mass obtained by polymerizing butadiene in the presence of sodium metal, 60 parts by weight of carbon black, 15 parts by weight of zinc oxide, 2 parts by weight of stearic acid, 2.5 parts by weight of sulfur and a solution of a vulcanization accelerator, and vulcanizing the mixture in the usual manner.

THEODOR GOOST.